United States Patent [19]

Foster

[11] Patent Number: 4,946,012
[45] Date of Patent: Aug. 7, 1990

[54] BRAKE ACTIVATED ACCELERATION OVERRIDE APPARATUS

[75] Inventor: Al Foster, Davisburg, Mich.

[73] Assignee: James G. Wells, Rochester, Mich.

[21] Appl. No.: 382,399

[22] Filed: Jul. 20, 1989

[51] Int. Cl.$^5$ .................... B60K 41/20; F02B 77/08
[52] U.S. Cl. ................ 192/1.46; 123/198 D; 123/198 DB
[58] Field of Search .............. 192/1.43, 1.45, 1.46, 192/1.28; 180/335; 123/394, 198 D, 198 DB

[56] References Cited

U.S. PATENT DOCUMENTS

| | | | |
|---|---|---|---|
| 2,433,205 | 12/1947 | Decker | 180/271 |
| 2,604,962 | 7/1952 | Tibbetts | 192/1.46 |
| 2,642,165 | 6/1953 | Banker | 192/1.46 |
| 2,912,081 | 11/1959 | Strauss | 192/1.46 X |
| 2,916,116 | 12/1959 | Eddy et al. | 192/1.28 |
| 3,145,814 | 8/1964 | Strauss | 192/1.46 |
| 3,331,477 | 7/1967 | Trifiletti et al. | 192/1.46 |
| 3,750,780 | 8/1973 | Danek | 192/1.46 |
| 3,757,913 | 9/1973 | Passon | 192/1.46 |

Primary Examiner—Richard Lorence
Attorney, Agent, or Firm—Basile and Hanlon

[57] ABSTRACT

A brake activated accelerator override apparatus for an engine having a throttle plate pivotal between closed and open positions. First and second throttle levers are connected to the throttle plate. The first throttle lever is connected to the accelerator linkage for pivoting the throttle plate to an open position. A coupling spring is connected between the first and second throttle levers to jointly pivot the first and second throttle levers to the open position upon movement of the accelerator linkage and to permit independent movement of the second throttle lever to the closed position. A sensor detects actuation of the vehicle brakes and energizes an actuator connected to the second throttle lever to pivot the second throttle lever and the attached throttle plate to the closed position, independent of the first throttle lever. Preferably, the actuator is an electromechanical solenoid having an extensible plunger which is connected by a link to the second throttle lever.

8 Claims, 2 Drawing Sheets

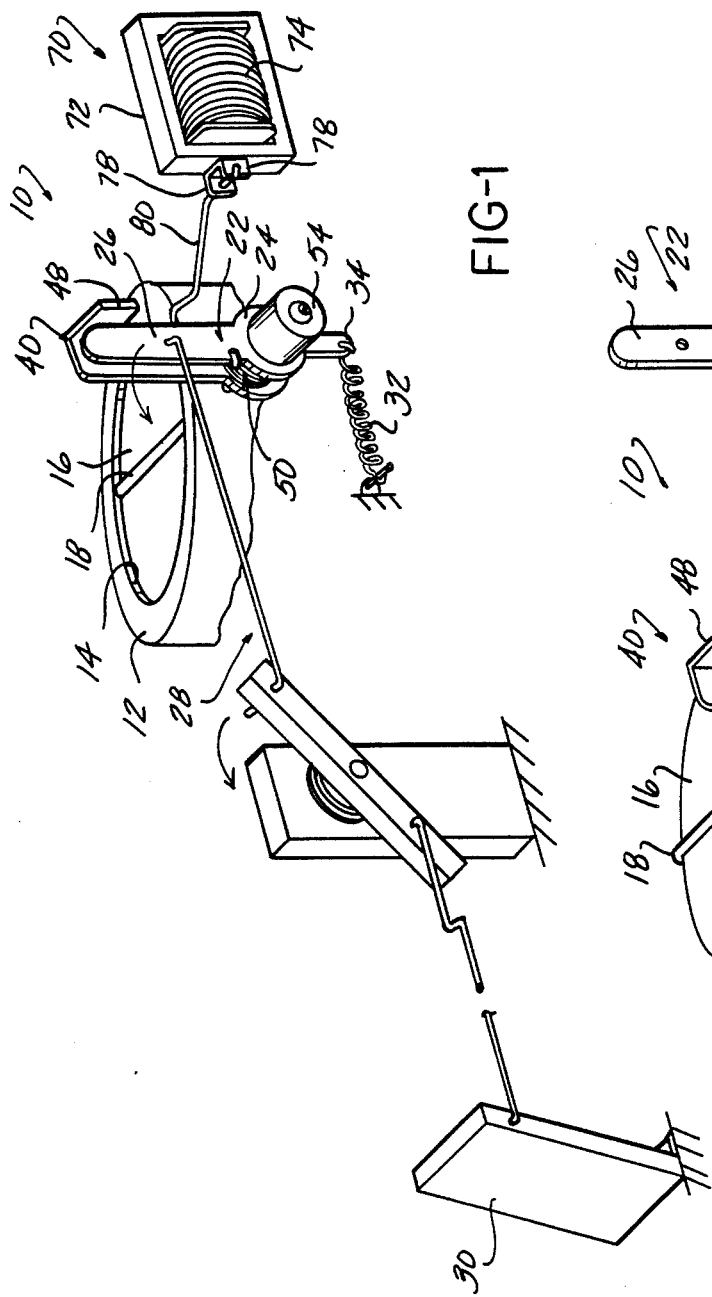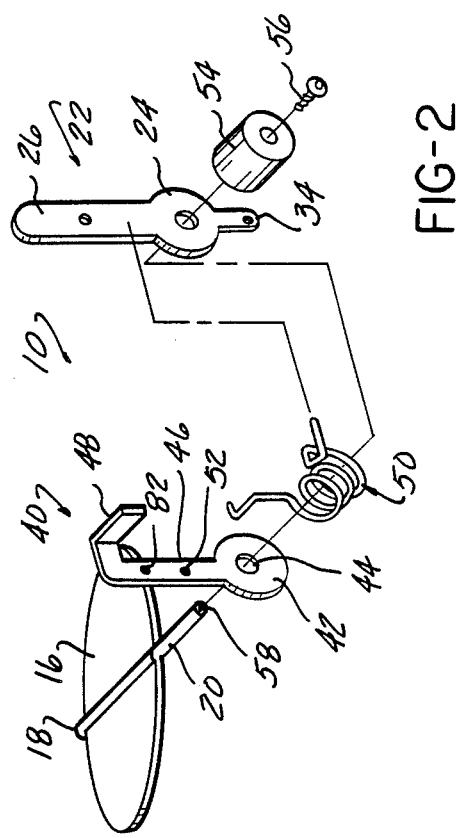

BRAKE ACTIVATED ACCELERATION OVERRIDE APPARATUS

BACKGROUND OF THE INVENTION

Field of the Invention

The present invention relates, in general, to vehicle engine throttle controls.

A conventional internal combustion engine includes a carburetor or throttle body, a throttle plate mounted within the carburetor or throttle body and pivotal between full open and closed positions, an accelerator linkage connected between the throttle plate and an accelerator pedal, a return spring biasing the throttle plate to the closed position and a throttle lever connected to the throttle plate and the linkage for pivoting the throttle plate between the open and closed positions. In normal operation, depression of the accelerator pedal causes pivoting of the throttle lever and the throttle plate toward the open position thereby increasing the volume of air flow to the engine. When the vehicle is decelerated, the return spring pivots the throttle lever and the throttle plate toward the closed position decreasing the amount of air flow to the engine and gradually slowing the engine to idle speed. An unsafe operating condition can occur if the accelerator linkage, the throttle lever or the throttle plate sticks in the full open position.

The brake system used to slow the vehicle to a stop is independent of the engine throttle controls. In normal use, the operator utilizes the same foot to control the accelerator pedal and to activate the vehicle brakes, alternating between the pedals as needed. However, the brakes can be applied while the accelerator is depressed. This results in an unsafe operating condition, as well as increasing wear on the brakes, the engine, the transmission and the transaxle and causing excessive fuel consumption. Further, if the brakes are applied when the accelerator is in the full open position, they are normally insufficient to bring the vehicle to a stop.

Several attempts have been made to provide an override for a carburetor throttle in the event that the throttle is stuck in the full open position. Such overrides are activated when the vehicle brakes are depressed. It would be desirable to provide an improved brake activated carburetor override which is of simple construction, easy to install on most engines, is functional on fuel injection systems and throttle bodies, and positively drives the throttle plate toward the closed, idle position when the vehicle brakes are applied independent of the position of the throttle lever connected to the vehicle accelerator linkage.

SUMMARY OF THE INVENTION

The present invention is a brake activated accelerator override apparatus for an engine with a carburetor, fuel injection system or a throttle body having a throttle plate pivotal between closed and open positions.

In a typical internal combustion engine, a first throttle plate lever is connected to the throttle plate and to an accelerator linkage means to pivot the throttle plate toward the open position upon movement of the accelerator linkage means. A return spring acts on the first throttle lever to bias the first throttle lever and the throttle plate to the closed position. A vehicle brake system is also associated with the vehicle.

The brake activated accelerator override apparatus comprise a second throttle plate lever connected to the throttle plate for pivoting the throttle plate to the closed position. Means are provided for sensing activation of the vehicle brake system. An actuator means, responsive to activation of the vehicle brake system, is connected to the second throttle plate lever for pivoting the second throttle lever and the throttle plate to the closed position independent of the first throttle lever whenever the vehicle brake system is activated.

In a preferred embodiment, a coupling spring is coupled between the first and second throttle plate levers to jointly pivot the first and second throttle plate levers to the open position through movement of the accelerator linkage and to yieldingly permit the second throttle plate lever to pivot to the closed position independent of the first throttle lever.

The brake sensor means may comprise any suitable sensor, such as a mechanical switch or a pressure sensor, which detects depression of the vehicle brake pedal or an increase in pressure in the vehicle brake system.

Preferably, the actuator means comprises an electromechanical solenoid having an extendible and retractable plunger. A link connects the plunger to the second throttle lever and, when current is supplied to the coil of the solenoid, such as when the vehicle brake system is activated, the plunger retracts pivoting the second throttle lever to the closed position thereby bringing the throttle plate to the closed, idle position independent of the first throttle lever.

The brake activated accelerator override apparatus of the present invention is easy to install on most internal combustion engines. The present brake activated accelerator override apparatus is formed of a small number of components so as to have minimum space requirements, long reliability and low power usage. The brake activated accelerator override apparatus provides safe vehicle operation, improved fuel economy and less brake and engine, transmission and transaxle wear.

BRIEF DESCRIPTION OF THE DRAWING

The various features, advantages and other uses of the present invention will become more apparent by referring to the following detailed description and drawing in which:

FIG. 1 is a perspective view of a brake activated accelerator override apparatus constructed in accordance with the teachings of the present invention shown mounted on the carburetor of an internal combustion engine;

FIG. 2 is an exploded, perspective view of the brake activated accelerator override apparatus shown in FIG. 1;

DESCRIPTION OF THE PREFERRED EMBODIMENTS

Figure 5:
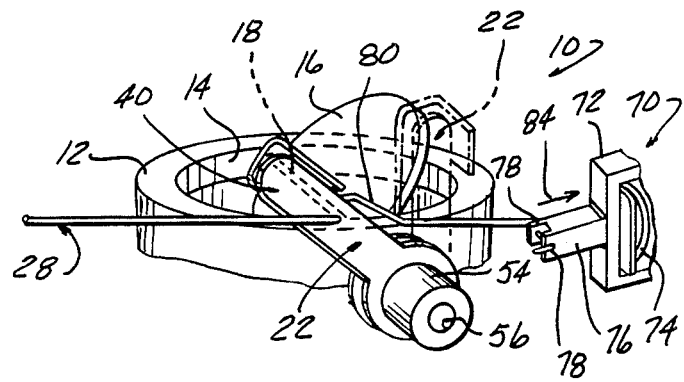
FIG. 5 is a perspective view showing the operation of the brake activated accelerator override apparatus.

Throughout the following description and drawing, an identical reference number is used to refer to the same component shown in multiple figures of the invention.

The brake activated accelerator override apparatus 10 of the present invention, as shown in FIGS. 1 and 2, automatically moves the engine throttle plate to a closed position whenever the brakes of a vehicle are activated. Such movement of the throttle plate is independent of the throttle lever which is responsive to the vehicle accelerator linkage.

As shown in FIG. 1, an internal combustion engine typically includes a carburetor 12 for mixing air and fuel into a combustible mixture. The term "carburetor" is used as an example only and will be understood to include any air intake device used on vehicle engines, such as throttle bodies and fuel injection system air intakes for example. The carburetor 12 has an inlet bore 14. A disk-like throttle plate 16 of generally circular configuration is pivotally mounted in the bore 14 of the carburetor 12 by means of a shaft 18 which is connected to the throttle plate 16 and pivotally connected at opposite ends to the body of the carburetor 12. One end 20 of the throttle plate shaft 18 extends outward through a side wall of the carburetor 12.

The throttle plate 16 is pivotal between a closed position shown in FIG. 1 and an open position shown in FIG. 5. The throttle plate 16 is pivoted between the closed and open positions by a first throttle lever 22 which is mounted on the end 20 of the throttle plate shaft 18. The first throttle lever 22 has a base portion with a through bore mounted about the end 20 of the throttle plate shaft 18 and an upwardly extending arm 26.

An accelerator linkage means, denoted in general by reference number 28, is connected to the arm 26 of the first throttle lever 22. The accelerator linkage means 28 is shown symbolically in FIG. 1 and is connected to the vehicle accelerator pedal 30. Movement of the accelerator pedal 30 is translated by the linkage 28 to movement of the first throttle lever 22. This results in movement of the throttle plate 16 between the open and closed positions dependent upon the position or amount of movement of the accelerator pedal 30.

A return spring 32 is connected to a lower finger portion 34 extending from the base 24 of the first throttle lever 22 and normally biases the first throttle lever 22 and the attached throttle plate 16 to the closed, idle position. Translation of the accelerator linkage 28, as described above, overcomes the bias of the return spring 32 to permit pivotal movemment of the first throttle lever 22 and the attached throttle plate 16 toward the open position. Release of pressure on the accelerator pedal 30 will enable the return spring 32 to move the attached throttle plate 16 to the closed, idle position.

Figure 3:
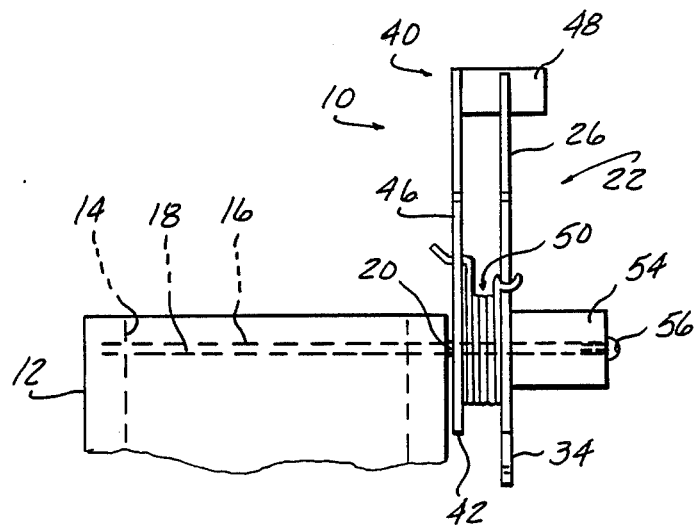
FIG. 3 is an end view of the brake activated accelerator override apparatus mounted on a carburetor.

As shown in FIGS. 1, 2 and 3, the brake activated accelerator override apparatus 10 of the present invention includes a second throttle lever 40. The second throttle lever 40 has an enlarged base portion 42 with an aperture 44 formed therein which is slidingly mounted about the outer end 20 of the throttle plate shaft 18. A planar arm 46 extends from the base 421 and terminates in a substantially perpendicularly extending flange 48.

A coupling scissors spring 50 is connected between the first and second throttle levers 22 and 40, respectively, and disposed about the exterior end 20 of the throttle plate shaft 18, as shown in FIGS. 2 and 3. One end of the coupling spring 50 is attached to an aperature 52 formed in the arm portion 46 of the second throttle lever 40. The other end of the coupling spring 50 is wrapped around one edge of the arm 26 of the first throttle lever 22. The coupling spring 50 provides joint movement of the first and second throttle levers 22 and 40 toward the open position upon movement of the first throttle lever 22 by the accelerator linkage 28 and the accelerator pedal 30. Further, the coupling spring 50 yieldingly permits movement of the second throttle lever 40 in a clockwise direction as viewed in FIG. 1 toward the throttle closed position independent from the position of the first throttle lever 22. Such movement of the second throttle lever 40, as described hereafter, causes a pivoting of the throttle plate shaft 20 and the attached throttle plate 16 toward the closed, idle position.

In conjunction with the coupling spring 50, the flange 48 on the end of the second throttle lever 40 is adapted to engage the end of the arm portion 26 of the first throttle lever 22 to ensure joint movement of the first and second throttle levers 22 and 40 toward the full open position.

A bushing 54 is mounted exteriorly from the first throttle lever 22 and is secured to the exterior end 20 of the throttle plate shaft 18 by means of a fastener 56 which is threadingly securable in a threaded bore 58 formed in the exterior end 20 of the throttle plate shaft 18.

Figure 4:
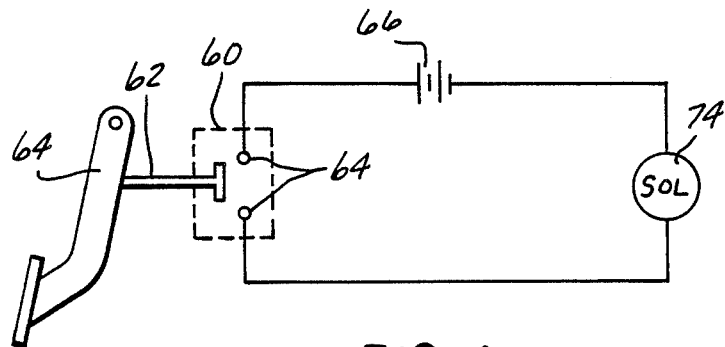
FIG. 4 is a schematic diagram showing the electrical circuitry employed with the brake activated accelerator override apparatus of the present invention.

The brake activated accelerator override apparatus 10 also includes means for sensing the activation of the brake system of the vehicle in which the brake activated accelerator override apparatus 10 is mounted. In a preferred embodiment, the means for sensing activation of the brakes comprises a mechanical switch 60 depicted symbolically in FIG. 4. The switch 60 includes a movable plunger 62 connected to the brake pedal 64 of the vehicle. The plunger 62 moves upon depression of the brake pedal 64 to contact 65 thereby supplying power from an electric power source, such as the vehicle battery 66, to a solenoid, described hereafter.

Alternately, the means for sensing activation of the vehicle brake system may comprise other types of sensors, such as a pressure switch mounted in the brake hydraulic system, to detect a pressure increase caused by depression of the vehicle brake pedal 64.

As shown in FIGS. 1 and 5, the brake activated accelerator override apparatus 10 includes actuator means denoted in general by reference number 70 which pivots the second throttle lever 40 to the closed position when the vehicle brakes are activated. In a preferred embodiment, the actuator means 70 comprises an electromechanical solenoid formed of an electromagnetic core 72 surrounding an electric coil 74 formed in a plurality of windings about an extendible and retractable plunger 76. As is conventional, the application of electric current to the coil 74 induces a magnetic field in the core 72 thereby magnetically attracting the plunger 76 into the core 72 as shown in FIG. 1. Absent any electric current flowing through the coil 74, the plunger 76 is free to extend from the core 72 under movement of the second throttle lever 40.

The exterior end of the plunger 76 has a generally U-shape formed of spaced arms 78. One end of a link 80 extends through aligned apertures formed in the arms 78. The opposite end of the link is connected to an aperature 82 formed in the arm 46 of the second throttle lever 40. Thus, pivotal movement of the second throttle lever 40 to the full open position shown in FIG. 5, caused by pivoting movement of the first throttle lever 22, as described above, causes an extension of the plunger 76 outward from the core 72 as shown in FIG. 5. When electric current is supplied to the coil 74 of the solenoid, the magnetic field induced in the core 72 attracts the plunger 76 causing retraction of the plunger 76 in a direction of arrow 84 in FIG. 5. This exerts a force on the second throttle lever 40 through the link 80 causing a pivotal movement of the second throttle lever 40 to the position shown in phantom in FIG. 5. Such pivotal movement of the second throttle lever 40 causes a simultaneous movement of the throttle plate 16 to the closed position independent of the first throttle lever 22.

In operation, with no brakes applied, movement of the accelerator pedal 30 through the linkage 28 causes rotation of the first throttle lever 22 and a pivoting of the throttle plate 16 toward the open position. The coupling spring 50 causes a simultaneous and like movement of the second throttle lever 40 in conjunction with the first throttle lever 22. Such movement of the second throttle lever 40 causes an extension of the plunger 76 of the actuator 70 outward from the core 72 of the actuator 70.

Regardless of the position of the first and second throttle levers 22 and 40, when the brake system of the vehicle is activated, such as that caused by a depression of the brake pedal 64 and a closure of the brake sensor switch 60, electric current is supplied to the coil 74 of the actuator 70 inducing a magnetic field in the electric core 72 and causing a retraction of the plunger 76 into the core 72. This pivots the second throttle lever 40 in a clockwise direction, as viewed in FIG. 5. Such pivotal movement of the second throttle lever 40 causes a simultaneous pivoting movement of the attached throttle plate 16 to the closed position thereby bringing the engine to an idle speed independent from the position or the influence of the first throttle lever 22.

There has been disclosed a unique brake activated accelerator override apparatus of simplified construction which positively ensures that the throttle plate of an internal combustion engine carburetor, throttle body or fuel injection system is brought to a fully closed position whenever the brake system of the vehicle is activated. Such pivoting movement of the throttle plate is independent of the position or influence of the first throttle lever attached to the vechicle accelerator linkage. Thus, safer operation of the vehicle is provided along with improved fuel economy, less brake wear, and reduced engine loading. The brake activated accelerator override apparatus of the present invention is of simplified construction for ease of installation on most internal combustion engines without undue modification.

What is claimed is:

1. A brake activated accelerator override apparatus for a vehicle having an engine with a throttle plate pivotal between closed and open positions, a first throttle lever connected to the throttle plate, an accelerator linkage means connected to the first throttle lever, a return spring acting on the first throttle lever to bias the first throttle lever and the throttle plate to a closed position and a vehicle brake system, the apparatus comprising:
   a second throttle lever connected to the throttle plate for pivoting the throttle plate to the closed position;
   means for sensing activation of the vehicle brake system; and
   actuator means, responsive to actuation of the vehicle brake system and connected to the second throttle lever, for pivoting the second throttle lever and the attached throttle plate to the closed position independent of the first throttle lever when the vehicle brake system is activated, the actuator means comprising:
      an electromagnetic solenoid having a core and coil and a plunger movably disposed within the core and retractable when electric current is applied to the coil of the solenoid; and
      a link connecting the plunger to the second throttle lever.

2. The brake activated accelerator override apparatus of claim further including:
   spring means coupled between the first and second throttle levers to pivot the first and second throttle levers jointly to the open position upon movement of the first throttle lever and to yieldingly permit the second throttle lever to pivot to the closed position independent of the first throttle lever.

3. The brake activated accelerator override apparatus of claim 1 wherein:
   the second throttle lever including an outwardly extending flange, the flange being engageable with the first throttle lever upon movement of the first and second throttle levers to the open position.

4. The brake activated accelerator override apparatus of claim 1 wherein the actuator means includes:
   spring means coupled between the first and second throttle levers to pivot the first and second throttle levers jointly to the open position upon movement of the first throttle lever and to yieldingly permit the second throttle lever to pivot to the closed position independent of the first throttle lever; and
   the second throttle lever including an outwardly extending flange engageable with the first throttle lever upon movement of the first and second throttle levers to the open position.

5. A brake activated accelerator override apparatus for a vehicle comprising:
   an engine having a throttle plate pivotal between open and closed positions;
   a first throttle plate lever connected to the throttle plate for pivoting the throttle plate between the open and closed positions;
   a vehicle throttle linkage means for normally pivoting the first throttle lever to the open position and including a return spring means connected to the first throttle lever for biasing the first throttle lever to the closed position;
   a second throttle lever connected to the throttle plate for pivoting the throttle plate to the closed position;
   means for sensing activation of the vehicle brake system; and
   actuator means, responsive to actuation of the vehicle brake system and connected to the second throttle lever, for pivoting the second throttle lever and the attached throttle plate to the closed position independent of the first throttle lever when the vehicle brake system is activated, the actuator means comprising:
      an electromagnetic solenoid having a core and a coil and a plunger movably disposed within the core and retractable when electric current is applied to the coil of the solenoid; and
      a link connecting the plunger to the second throttle lever.

6. The brake activated accelerator override apparatus of claim 5 further including: ·
   spring means coupled between the first and second throttle levers to pivot the first and second throttle levers jointly to the open position upon movement of the first throttle lever and to yieldingly permit the second throttle lever to pivot to the closed position independent of the first throttle lever.

7. The brake activated accelerator overrride apparatus of claim 5 wherein:
the second throttle lever includes an outwardly extending flange, the flange being engageable with the first throttle lever upon movement of the first and second throttle levers to the open position.

8. The brake activated accelerator override apparatus of claim 5 wherein the actuating means comprises:
spring means coupled between the first and second throttle levers to pivot the first and second throttle levers jointly to the open position upon movement of the first throttle lever and to yieldingly permit the second throttle lever to pivot to the closed position independent of the first throttle lever; and
the second throttle lever including an outwardly extending flange engageable with the first throttle lever upon movement of the first and second throttle levers to the open position.

* * * * *